United States Patent
Du et al.

(10) Patent No.: US 9,225,728 B2
(45) Date of Patent: *Dec. 29, 2015

(54) METHOD AND DEVICE FOR ANONYMOUS ENTITY IDENTIFICATION

(75) Inventors: Zhiqiang Du, Shaanxi (CN); Manxia Tie, Shaanxi (CN); Xiaolong Lai, Shaanxi (CN); Qin Li, Shaanxi (CN)

(73) Assignee: CHINA IWNCOMM CO., LTD. (CN)

( * ) Notice: Subject to any disclaimer, the term of this patent is extended or adjusted under 35 U.S.C. 154(b) by 143 days.

This patent is subject to a terminal disclaimer.

(21) Appl. No.: 13/884,749

(22) PCT Filed: Jun. 24, 2011

(86) PCT No.: PCT/CN2011/076296

§ 371 (c)(1),
(2), (4) Date: May 10, 2013

(87) PCT Pub. No.: WO2012/062120

PCT Pub. Date: May 18, 2012

(65) Prior Publication Data

US 2013/0232551 A1 Sep. 5, 2013

(30) Foreign Application Priority Data

Nov. 12, 2010 (CN) .......................... 2010 1 0546339

(51) Int. Cl.
*H04L 29/06* (2006.01)
*H04L 9/32* (2006.01)

(52) U.S. Cl.
CPC .............. *H04L 63/12* (2013.01); *H04L 9/3255* (2013.01); *H04L 63/0407* (2013.01); *H04L 63/08* (2013.01)

(58) Field of Classification Search
CPC ... H04L 63/12; H04L 63/0407; H04L 9/3255; H04L 63/08
USPC .......................................................... 726/3
See application file for complete search history.

(56) References Cited

U.S. PATENT DOCUMENTS 5,491,750 A * 2/1996 Bellare et al. ................. 713/155
7,181,614 B1 * 2/2007 Gehrmann et al. ........... 713/155

(Continued)

FOREIGN PATENT DOCUMENTS

CN 1668005 9/2005
CN 1934823 A 3/2007

(Continued)

OTHER PUBLICATIONS

"The Progress of Tri-Element Peer Authentication (TePA) and Access Control Method", *Tracks for Standard & Technology*, Jun. 2009, (http.//www.its.cesi.cn), p. 21-23.

(Continued)

Primary Examiner — Joseph P Hirl
Assistant Examiner — J. Brant Murphy
(74) Attorney, Agent, or Firm — DLA Piper LLP (US)

(57) ABSTRACT

The present invention discloses a method for anonymous entity identification, which comprises the following steps: an entity A transmits an $R_A$ and an $I_{GA}$ to an entity B; the entity B returns an $R_B$, an $I_{GB}$ and a TokenBA to the entity A; the entity A sends an $R_A'$, the $R_B$, the $I_{GA}$ and the $I_{GB}$ to a credible third-party TP; the credible third-party TP checks the validity of a first group and a second group according to the $I_{GA}$ and the $I_{GB}$; the credible third-party TP returns an $RES_{GA}$, an $RES_{GB}$, and a TokenTA to the entity A, or returns the $RES_{GA}$, the $RES_{GA}$, a TokenTA1 and a TokenTA2 to the entity A; and the entity A performs a verification after receiving them; the entity A sends a TokenAB to the entity B; and the entity B performs the verification after receiving it. In the present invention, there is no need to send the identity information of the entity to be identified to an opposite terminal, so that anonymous identity identification is realized.

15 Claims, 3 Drawing Sheets

(56) References Cited

U.S. PATENT DOCUMENTS

| | | | |
|---|---|---|---|
| 8,356,179 B2* | 1/2013 | Tie et al. | 713/170 |
| 2002/0076042 A1* | 6/2002 | Sandhu et al. | 380/30 |
| 2003/0195857 A1* | 10/2003 | Acquisti | 705/74 |
| 2004/0059685 A1* | 3/2004 | Sakamura et al. | 705/65 |
| 2004/0260926 A1* | 12/2004 | Arditti Modiano et al. | 713/170 |
| 2005/0097316 A1* | 5/2005 | Kim | 713/163 |
| 2005/0257260 A1* | 11/2005 | Lenoir et al. | 726/21 |
| 2006/0281442 A1* | 12/2006 | Lee et al. | 455/412.2 |
| 2008/0091941 A1* | 4/2008 | Yonezawa et al. | 713/158 |
| 2008/0178005 A1* | 7/2008 | Gentry | 713/176 |
| 2008/0270798 A1 | 10/2008 | Charles et al. | |
| 2009/0089575 A1* | 4/2009 | Yonezawa et al. | 713/156 |
| 2009/0254750 A1 | 10/2009 | Bono et al. | |
| 2009/0276630 A1* | 11/2009 | Teranishi | 713/176 |
| 2010/0306839 A1* | 12/2010 | Tie et al. | 726/9 |
| 2012/0072732 A1* | 3/2012 | Canard et al. | 713/176 |
| 2012/0284518 A1* | 11/2012 | Walker et al. | 713/171 |

FOREIGN PATENT DOCUMENTS

| | | |
|---|---|---|
| CN | 101141711 | 3/2008 |
| CN | 101247223 | 8/2008 |
| CN | 101364876 | 2/2009 |
| CN | 101599959 A | 12/2009 |
| CN | 101635624 | 1/2010 |
| CN | 101640593 | 2/2010 |
| CN | 101645776 | 2/2010 |
| CN | 101674182 | 3/2010 |
| CN | 101984577 | 3/2011 |
| CN | 101997688 | 3/2011 |
| EP | 2 214 429 A1 | 8/2010 |
| JP | 2004-54905 | 2/2004 |
| JP | 2009-33740 | 2/2009 |
| JP | 2013-544052 | 12/2013 |

OTHER PUBLICATIONS

Takehisa Kato, et al., "Development of Anonymous Authentication System for Personal Data Protection," Oct. 15, 2003, pp. 569-574 (English Abstract).

A Study on Authentication Mechanism of WWW System Using IC Cards, Toshiaki Tanaka, Satoshi Hada and Mitsuru Yamada KDD R&D Labs, pp. 3-363-3-364 (English Summary).

"Survey on 'Status of Identity Authentication Technologies,'" Security Center of Information-Technology Promotion Agency, Japan, Mar. 2003, pp. 13-19 and an English translation.

Schneier, Bruce, "Applied Cryptography 2nd Edition: Protocols, algorithms, and source code in C," 1996, pp. 59-60.

A. Menezes, et al., "Handbook of Applied Cryptography," CRC Press, Inc., 1996, pp. 489-541.

* cited by examiner

METHOD AND DEVICE FOR ANONYMOUS ENTITY IDENTIFICATION

This application is a US National Stage of International Application No. PCT/CN2011/076296, filed on 24 Jun. 2011, designating the United States, and claiming priority from Chinese Patent Application No. 201010546339.3, filed with the Chinese Patent Office on Nov. 12, 2010 and entitled "Method and Device for Anonymous Entity Identification", which is hereby incorporated by reference in its entirety.

The present invention relates to a method and device for entity identification, and particularly to a method and device for anonymous entity identification.

BACKGROUND OF THE INVENTION

At present, an entity identification method using an asymmetric password technology involves two scenarios, in one of which there is an on-line trusted third party involved and in the other of which there is no trusted third party involving involved, where the identity of an identified entity can be verified for legality through entity identification, and at the same time, an identifier can further obtain identity information of the identified entity. However, such a scenario may arise in real life that the identified entity would not like to have its identity information disclosed. For example, when people vote on some sensitive events, e.g., voting on a personnel appointment decision, electronic bidding, etc., anonymous voting is desirable, that is, their own voting opinions are signed without exposing their identities. Thus, there is a need of an anonymous entity identification method capable of both identifying the identity of an entity and protecting identity information of the identified entity from being exposed.

SUMMARY OF THE INVENTION

In order to address the foregoing technical problem in the prior art, the invention proposes a method and device for anonymous entity identification.

A method for anonymous entity identification includes the following steps:

1) sending, by an entity A, a first message to an entity B, wherein the first message comprises a random number $R_A$ generated by the entity A;

2) returning, by the entity B, a second message to the entity A after receiving the first message, wherein the second message comprises an identity $I_{GB}$ of a second group and a token field TokenBA containing a signature of the entity B on a message including a distinguishing identifier GB of the second group and the $R_A$, and the entity B resides in the second group;

3) sending, by the entity A, a third message to a trusted third party TP after receiving the second message, wherein the third message comprises the $I_{GB}$;

4) checking, by the trusted third party TP, the second group for legality according to the $I_{GB}$ after receiving the third message;

5) returning, by the trusted third party TP, a fourth message to the entity A after checking the second group for legality, wherein the fourth message comprises a verification result $Res_{GB}$ of the second group; and 6) identifying, by the entity A, identity of the entity B according to the verification result $Res_{GB}$ in the fourth message and the token field TokenBA after receiving the fourth message and verifying the fourth message for validity.

The invention further provides an entity device for anonymous entity identification including:

a first message sending unit configured to send a first message to an entity B, wherein the first message comprises a random number $R_A$ generated by the entity device for anonymous entity identification;

a second message receiving unit configured to receive a second message returned from the entity B, wherein the second message comprises an identity $I_{GB}$ of a second group and a token field TokenBA containing a signature of the entity B on a message comprising a distinguishing identifier GB of the second group and the $R_A$, and the entity B resides in the second group;

a third message sending unit configured to send a third message to a trusted third party TP after receiving the second message, wherein the third message comprises the $I_{GB}$;

a fourth message receiving unit configured to receive a fourth message retuned from the trusted third party TP after checking the second group for legality, wherein the fourth message comprises a verification result $Res_{GB}$ of the second group; and an identifying unit configured to identify identity of the entity B according to the verification result $Res_{GB}$ in the fourth message and the token field TokenBA after receiving the fourth message and verifying the fourth message for validity.

The invention further provides another device for anonymous entity identification including:

a first message receiving unit configured to receive a first message sent by an entity A, wherein the first message comprises a random number $R_A$ generated by the entity A; and a second message sending unit configured to return a second message to the entity A after receiving the first message, wherein the second message comprises an identity $I_{GB}$ of a second group and a token field TokenBA containing a signature of the device for anonymous entity identification on a message comprising a GB and the $R_A$, and the device for anonymous entity identification resides in the second group.

The invention further provides an device for legality verification including:

a third message receiving device configured to receive a third message sent by an entity A, wherein the third message comprises an $I_{GB}$ or the $I_{GB}$ and an $I_{GA}$, the $I_{GB}$ is an identity of a second group, the $I_{GA}$ is an identity of a first group, and the entity A resides in the first group;

a legality checking unit configured to check the second group or the second group and the first group for legality according to the $I_{GB}$ or the $I_{GB}$ and the $I_{GA}$ after receiving the third message; and a result returning unit configured to return a fourth message to the entity A after checking the second group or the second group and the first group for legality, wherein the fourth message comprises a verification result $Res_{GB}$ of the second group or verification results $Res_{GB}$ and $Res_{GA}$ of the second group and the first group.

In the invention, an identified entity will not need to send its own identity information to an opposite entity or a trusted third party but will send only identity information of a group where it resides to the opposite entity or the trusted third party for verification, and an verification result will be transmitted to the requested opposite entity. The opposite entity can accomplish the verification on a signature of the identified entity simply through a verification result of the trusted third party on the group where the identified entity resides, to thereby accomplish the identification on the identity of the identified entity. Throughout the identification process, the identity information of the identified entity need not be disclosed and transmitted to the opposite entity, to thereby avoid the identity information of the identified entity from being exposed. The invention defines an anonymous entity identifying mechanism capable of protecting identity information of an identified entity as compared with the traditional entity identifying mechanism.

DETAILED DESCRIPTION OF THE EMBODIMENTS

Figure 1:
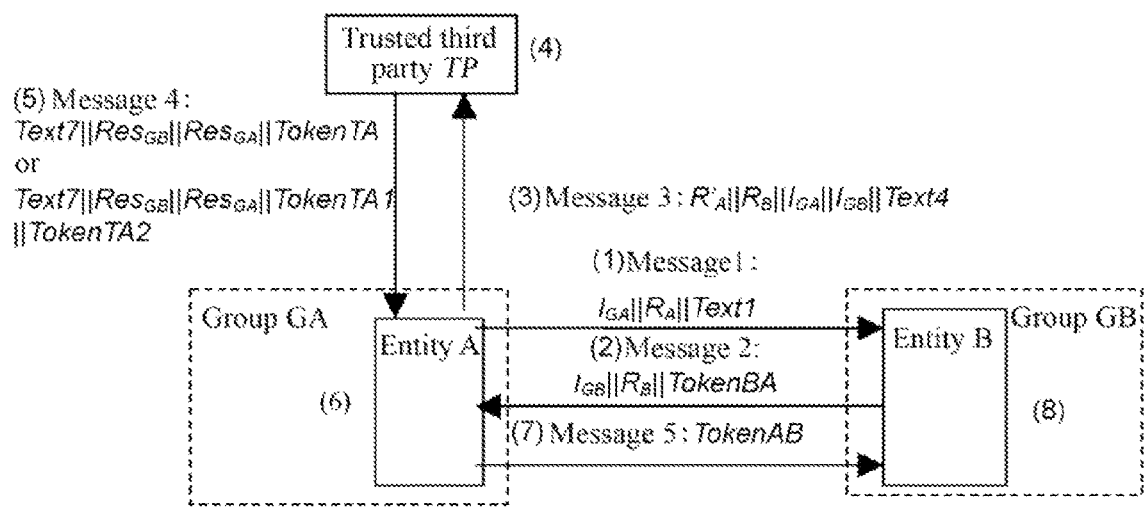
FIG. 1 is a schematic diagram of a preferred implementation of a bidirectional method for anonymous entity identification according to the invention.

A method according to the invention involves entities including identified entities A and B, a first group and a second group, and a Trusted third Party TP. The entities A and B reside respectively in the first group and the second group as members of the groups where they reside respectively. The Trusted third Party TP is a trusted third party of the entities A and B as well as the first group and the second group, and provides an identification service for the entities. Before being identified, the entities A and B possess their own private keys respectively, the first group and the second group possess their own group public keys respectively, and signatures generated by the entities A and B through using their own private keys can be verified by using the pubic keys of the groups where they reside respectively.

The following notations are defined for the sake of convenience:

GA indicates a distinguishing identifier of the first group, GB indicates a distinguishing identifier of the second group, $Valid_{GX}$ indicates the validity of a certificate $Cert_{GX}$ of a group GX (X represents A or B, where A refers to the entity A, and B refers to the entity B here and hereinafter); $PublicKey_{GX}$ is a public key of the group GX; $I_{GX}$ is an identity of the group GX, which can be the certificate $Cert_{GX}$ or the distinguishing identifier of the group; $Res_{GX}$ indicates a verification result of the group GX consisted of the certificate $Cert_{GX}$ and the validity thereof $Valid_{GX}$ or consisted of the group GX and the public key thereof $PublicKey_{GX}$; Token is a token field; $sS_Y$ (M) is a signature of Y on a message M (Y represents A or B or T, where T refers to the trusted third party TP here and hereinafter); and Text is an optional text.

A method for anonymous entity identification according to an embodiment of the invention includes the following steps:

1) An entity A sends a first message to an entity B, where the first message includes a random number $R_A$ generated by the entity A;

2) The entity B returns a second message to the entity A after receiving the first message, where the second message includes an identity $I_{GB}$ of a second group and a token field TokenBA containing a signature of the entity B on a message including a GB and the $R_A$, and the entity B resides in the second group;

3) The entity A sends a third message to a trusted third party TP after receiving the second message, where the third message includes the $I_{GB}$;

4) The trusted third party TP checks the second group for legality according to the against $I_{GB}$ after receiving the third message;

5) The trusted third party TP returns a fourth message to the entity A after checking the second group for legality, where the fourth message includes a verification result $Res_{GB}$ of the second group; and 6) The entity A identifies the identity of the entity B according to the verification result $Res_{GB}$ in the fourth message and the token field TokenBA after receiving the fourth message and verifying the fourth message for validity.

In the embodiment of the invention, it is firstly determined whether the fourth message is valid, that is, whether the identity of the trusted third party sending the fourth message is legal and whether the contents of the message are correct, and in the case that the fourth message is determined to be valid, it can be determined whether the identity of the second group is legal according to the verification result $Res_{GB}$ in the fourth message, so that the verification on the signature of the identified entity can be accomplished simply through the verification result of the trusted third party on the group where the identified entity resides, to thereby accomplish the identification on the identity of the identified entity. Throughout the identification process, the identity information of the identified entity need not be disclosed and transmitted to the opposite entity, to thereby avoid the identity information of the identified entity from being exposed. The embodiment of the invention defines an anonymous entity identifying mechanism capable of protecting identity information of an identified entity as compared with the traditional entity identifying mechanism.

In the step 6), the identity of the entity B is identified according to the verification result $Res_{GB}$ in the fourth message and the token field TokenBA preferably as follows:

6.2) The entity A obtains the verification result $Res_{GB}$ of the second group, and if the second group is determined to be legal and valid according to the $Res_{GB}$, then the entity A performs the step 6.3); otherwise, the entity A finishes the identity identification of the entity B, that is, the entity A determines that the identity of the entity B is illegal; and 6.3) The entity A obtains a public key $PublicKey_{GB}$ of the second group, verifies the signature of the entity B in the TokenBA in the second message and checks whether the random number $R_A$ in the first message is consistent with the random number $R_A$ contained in the signature of the entity B in the TokenBA to thereby finish the identity identification of the entity B, for example, when the signature of the entity B is correct and the $R_A$ in the first message is consistent with the $R_A$ contained in the signature of the entity B, the entity A determines that the identity of the entity B is legal; otherwise, the entity A determines that the identity of the entity B is illegal.

Preferably in this embodiment, the entity A verifies the fourth message for validity as follows:

The third message further includes a random number $R'_A$ regenerated by the entity A, where the $R'_A$ may be the same as or different from the $R_A$, and the fourth message further includes a token field TokenTA containing a signature of TP on a message including the $R'_A$ and the $Res_{GB}$, and in the step 6), the process of verifying the fourth message for validity includes:

6.1) The entity A verifies the signature of the trusted third party TP in the TokenTA in the fourth message, and when the signature is valid, the entity A checks the $R'_A$ generated by the entity A in the third message is consistent with $R'_A$ contained in the signature of the trusted third party TP in the TokenTA, and if they are consistent, then the entity A determines that the fourth message is valid and performs the step 6.2); otherwise, the entity A determines that the identification fails.

In the foregoing embodiment of the invention, one entity identifies another entity, and preferably some messages and flows can be added to the messages in the foregoing embodiment to thereby accomplish mutual identity identification between the two entities, and in a mechanism of further identifying the identity of the entity A by the entity B in the embodiment of the invention, an identity $I_{GA}$ of a first group is added to the first message sent by the entity A to the entity B, the $I_{GA}$ is added to the third message sent by the entity A to the trusted third party TP, and in the step 4), the trusted third party TP further checks the first group for legality according to the $I_{GA}$ after receiving the third message and adds a verification result $Res_{GA}$ of the first group by TP to the fourth message sent to the entity A.

Then after the step 6), in order to accomplish the identity identification of the entity B on the entity A, the method further includes:

7) The entity A sends a fifth message to the entity B, where the fifth message includes a token field TokenAB containing the $Res_{GA}$ and a signature of the entity A on a message including the GA, the $R_A$ and the GB; or the third message sent by the entity A to the trusted third party TP includes the random number $R'_A$ regenerated by the entity A, and the TokenAB includes the $R'_A$, the $Res_{GB}$, the $Res_{GA}$ and a signature of the entity A on a message including the GA, the $R_A$ and the GB, and the entity A resides in the first group; and 8) The entity B identifies the identity of the entity A according to the token field TokenAB in the fifth message after receiving the fifth message and verifying the fifth message for validity.

Preferably in the step 8), the entity B identifies the identity of the entity A according to the token field TokenAB in the fifth message particularly as follows:

8.2) The entity B obtains the $Res_{GA}$, and if the first group is determined to be legal and valid according to the $Res_{GA}$, then the entity B performs the step 8.3); otherwise, the entity B finishes the identification of the entity A; and 8.3) The entity B obtains a public key of the first group, verifies the signature of the entity A in the TokenAB and checks whether the distinguishing identifier GB of the second group is consistent with the GB included contained in the signature data of the entity A in the TokenAB to thereby finish the identity identification of the entity A.

The entity B can verify the fifth message for validity particularly in the following mechanism: the second message sent by the entity B to the entity A further includes a random number $R_B$ generated by the entity B, the third message sent by the entity A to the trusted third party TP includes the $R_B$ and the random number $R'_A$ regenerated by the entity A, and the fourth message sent by the trusted third party TP to the entity A includes a TokenTA or includes a TokenTA1 and a TokenTA2, wherein the TokenTA includes a signature of the trusted third party TP on a message including the $R'_A$, the $R_B$, the $Res_{GB}$ and the $Res_{GA}$, the TokenTA1 includes a signature of the trusted third party TP on a message including the $R'_A$ and the $Res_{GB}$, and the TokenTA2 includes a signature of the trusted third party TP on a message including the $R_B$ and the $Res_{GA}$; and the entity B receives the fifth message and verifies the fifth message for validity particularly as follows:

8.1) The entity B verifies the signature of the trusted third party TP contained in the TokenTA or the TokenTA2 in the TokenAB and checks whether the $R_B$ generated by the entity B in the second message is consistent with the $R_B$ contained in the signature of the trusted third party TP in the TokenTA or the TokenTA2, and if they are consistent, then the entity B determines that the fifth message is valid.

Preferably, the TokenAB includes the $Res_{GA}$, the TokenTA2 and a signature of the entity A on a message including the GA, the $R_A$, the GB, the $R_B$ and the TokenTA2; or the TokenAB includes the $R'_A$, the $Res_{GB}$, the $Res_{GA}$, the TokenTA and a signature of the entity A on a message including the GA, the $R_A$, the GB, the $R_B$ and the TokenTA, and in the step 8.3), after the entity B verifies the signature of the entity A in the TokenAB, the method further includes:

The entity B checks whether the $R_B$ in the second message is consistent with the $R_B$ contained in the signature of the entity A in the TokenAB.

Preferably in the step 4), the trusted third party TP checks the second group or the first group and the second group for legality particularly as follows:

In the third message, if the $I_{GA}$ is the distinguishing identifier GA of the first group, then TP searches for a valid public key $PublicKey_{GA}$ of the first group; and if the $I_{GA}$ is a certificate $Cert_{GA}$ of the first group, then TP checks the certificate $Cert_{GA}$ for validity $Valid_{GA}$; and If the $I_{GB}$ is the distinguishing identifier GB of the second group, then TP searches for a valid public key $PublicKey_{GB}$ of the second group; and if the $I_{GB}$ is a certificate $Cert_{GB}$ of the second group, then TP checks the certificate $Cert_{GB}$ for validity $Valid_{GB}$.

The above random numbers $R_A$, $R'_A$ and $R_B$ are replaced with time labels or sequence numbers. The first message, the third message and the fourth message further include optional texts respectively.

Preferred embodiments of the invention will be given below with reference to the drawings.

Referring to FIG. 1, a specific flow of bidirectional identification between an entity A and an entity B is as follows:

1) The entity A sends a first message to the entity B, where the first message includes a random number $R_A$ generated by the entity A, an identity $I_{GA}$ of a first group and an optional text Text1.

2) The entity B returns a second message to the entity A after receiving the first message, where the second message includes a random number $R_B$ generated by the entity B, an identity $I_{GB}$ of a second group and a token field TokenBA containing a signature of the entity B on a message including a GB, the $R_B$, a GA and the $R_A$, and particularly, the entity B generates the signature by its own private key.

3) The entity A sends a third message to a trusted third party TP after receiving the second message, where the third message includes a random number $R'_A$ regenerated by the entity A, the $R_B$, the identity $I_{GA}$ of the first group, the identity $I_{GB}$ of the second group and an optional text Text4.

4) The trusted third party TP checks the first group and the second group for legality according to the identities $I_{GA}$ and $I_{GB}$ after receiving the third message.

The trusted third party TP checks the first group and the second group for legality particularly in the following several approaches:

In the third message, if the identifier $I_{GA}$ of the first group is the distinguishing identifier GA of the first group, then the trusted third party TP searches for a valid public key $PublicKey_{GA}$ of the first group; and if the identifier $I_{GA}$ of the first group is a certificate $Cert_{GA}$ of the first group, then the trusted third party TP checks the certificate $Cert_{GA}$ for validity $Valid_{GA}$; and if the $Cert_{GA}$ is determined to be valid, then the first group is determined to be legal; otherwise, the first group is determined to be illegal; and if the identifier $I_{GB}$ of the second group is the distinguishing identifier GB of the second group, then the trusted third party TP searches for a valid public key PublicKey$_{GB}$ of the second group corresponding to the GB; and if the identifier I$_{GB}$ of the second group is a certificate Cert$_{GB}$ of the second group, then the trusted third party TP checks the certificate Cert$_{GB}$ for validity Valid$_{GB}$; and if the Valid$_{GB}$ is valid, then the second group is determined to be legal; otherwise, the second group is determined to be illegal.

5) The trusted third party TP returns a fourth message to the entity A after checking the first group and the second group for legality, where the fourth message includes group verification results Res$_{GA}$ and Res$_{GB}$, a token field TokenTA and an optional text Text7 or includes group verification results Res$_{GA}$ and Res$_{GB}$, token fields TokenTA1 and TokenTA2 and an optional text Text7, wherein the TokenTA includes a signature of the trusted third party TP using its own private key on a message including the R'$_A$, the R$_B$, the Res$_{GB}$ and the Res$_{GA}$, the TokenTA1 includes a signature of the trusted third party TP using its own private key on a message including the R'$_A$ and the Res$_{GB}$, and the TokenTA2 includes a signature of the trusted third party TP using its own private key on a message including the R$_B$ and the Res$_{GA}$.

6) The entity A verifies the fourth message after receiving the fourth message. The verification process is as follows:

6.1) The entity A verifies the signature of the trusted third party TP in the TokenTA or the TokenTA1 in the fourth message using a public key of the TP and checks whether the random number R'$_A$ generated by the entity A in the third message is consistent with the random number R'$_A$ contained in the signature of the trusted third party TP in the TokenTA or the TokenTA1, and if the verification passes, that is, the signature of the trusted third party TP is correct and R'$_A$s are consistent, then the entity A performs the step 6.2); otherwise, the entity A determines that the identification fails;

6.2) The entity A obtains the verification result Res$_{GB}$ of the second group from the fourth message, and if the second group is determined to be legal and valid according to the Res$_{GB}$, then the entity A performs the step 6.3); otherwise, the entity A finishes the identification of the entity B, that is, the entity A determines that the identity of the entity B is illegal; and 6.3) The entity A obtains the public key of the second group, verifies the signature of the entity B in the token TokenBA in the second message by using the obtained public key and checks whether the distinguishing identifier GA of the first group is consistent with the distinguishing identifier GA of the first group contained in the signature of the entity B in the TokenBA, and checks whether the random number R$_A$ generated by the entity A in the first message is consistent with the random number R$_A$ contained in the signature of the entity B in the TokenBA, and if the verification passes, that is, the signature of the entity B is correct, GAs are consistent and R$_A$s are consistent, then the entity A determines that the identity of the entity B is legal; otherwise, the entity A determines that the identity of the entity B is illegal, so that the entity A finishes the identification of the entity B and performs the step 7).

7) The entity A sends a fifth message to the entity B, where the fifth message includes a token TokenAB. The TokenAB contains the Res$_{GA}$, the TokenTA2 and a signature of the entity A on a message including the GA, the R$_A$, the GB, the R$_B$ and the TokenTA2 or contains the R'$_A$, the Res$_{GB}$, the Res$_{GA}$, the TokenTA and a signature of the entity A on a message including the GA, the R$_A$, the GB, the R$_B$ and the TokenTA.

8) The entity B verifies the fifth message after receiving the fifth message. The verification process is as follows:

8.1) The entity B verifies the signature of the trusted third party TP contained in the TokenTA or the TokenTA2 in the TokenAB by using the public key of TP and checks whether the random number R$_B$ generated by the entity B in the second message is consistent with the random number R$_B$ contained in the signature of the trusted third party TP in the TokenTA or the TokenTA2, and if the verification passes, that is, the signature of the trusted third party TP is correct and R$_B$s are consistent, then the entity B performs the step 8.2);

8.2) The entity B obtains the verification result Res$_{GA}$ of the first group, and if the first group is determined to be legal and valid according to the Res$_{GA}$, then the entity B performs the step 8.3); otherwise, the entity B finishes the identification of the entity A, that is, the entity B determines that the entity A is illegal; and 8.3) The entity B obtains the public key of the first group, verifies the signature of the entity A in the TokenAB and checks whether the distinguishing identifier GB of the second group is consistent with the distinguishing identifier GB of the second group contained in the signature of the entity A in the TokenAB, and checks whether the random number R$_B$ generated by the entity B in the second message is consistent with the random number R$_B$ contained in the signature of the entity A in the TokenAB, and if the verification passes, that is, the signature of the entity A is correct, distinguishing identifiers are consistent and R$_B$s are consistent, then the entity B determines that the entity A is legal; otherwise, the entity B determines that the entity A is illegal, so that the entity B finishes the identification of the entity A.

Particularly, the random numbers R$_A$, R'$_A$ and R$_B$ can be replaced with time labels or sequence numbers.

With the foregoing anonymous bidirectional identification process between the entity A and the entity B, bidirectional identity legality identification between the two entities can be accomplished and the identity information of the two entities can be protected from being exposed.

Furthermore, the invention further provides preferred embodiments of definitions of token fields in accordance with the foregoing bidirectional identification process:

1) Definition 1

TokenBA=Text3$\|$sS$_B$(GB$\|$R$_B$$\|$GA$\|$R$_A$$\|$Text2)
TokenTA1=sS$_T$(R'$_A$$\|$Res$_{GB}$$\|$Text6)
TokenTA2=sS$_T$(R$_B$$\|$Res$_{GA}$$\|$Text5)
TokenAB=Res$_{GA}$$\|$Text9$\|$TokenTA2$\|$sS$_A$(GA$\|$R$_A$$\|$GB$\|$R$_B$$\|$TokenTA2$\|$Text8)

2) Definition 2

TokenBA=Text3$\|$sS$_B$(GB$\|$R$_B$$\|$GA$\|$R$_A$$\|$Text2)
TokenTA=sS$_T$(R'$_A$$\|$R$_B$$\|$Res$_{GB}$$\|$Res$_{GA}$$\|$Text5)
TokenAB=R'$_A$$\|$Text9$\|$Res$_{GB}$$\|$Res$_{GA}$$\|$TokenTA$\|$sS$_A$(GA$\|$R$_A$$\|$GB$\|$R$_B$$\|$TokenTA$\|$Text8)

Wherein "X$\|$Y" indicates a result of splicing sequentially a data item X and a data item Y in that order.

Figure 2:
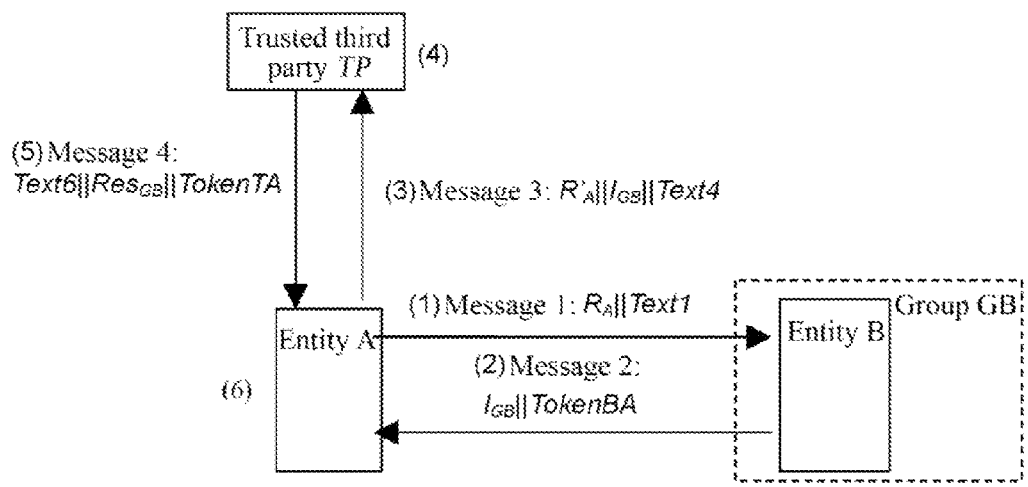
FIG. 2 is a schematic diagram of a preferred implementation of a unidirectional method for anonymous entity identification according to the invention.

In a practical application, sometimes only unidirectional identification of the entity A on the entity B is required to be accomplished, and at this time the method according to the foregoing embodiment can be modified by omitting the steps 7) and 8) and simplifying the contents of the first message to the fourth message to accomplish unidirectional identification of the entity A on the entity B, and the modified identification flow is as illustrated in FIG. 2 and described as follows:

1) The entity A sends a first message to the entity B, where the first message includes a random number R$_A$ generated by the entity A and an optional text Text1.

2) The entity B returns a second message to the entity A after receiving the first message, where the second message includes an identity $I_{GB}$ of a second group and a token TokenBA, wherein a preferred embodiment of the TokenBA is TokenBA=Text3∥$sS_B$(GB∥$R_A$∥Text2), and in another embodiment, the TokenBA includes at least a signature of the entity B on a message including a GB and the $R_A$.

3) The entity A sends a third message to a trusted third party TP after receiving the second message, where the third message includes a random number $R'_A$, the identity $I_{GB}$ and an optional text Text4.

4) The trusted third party TP checks the second group for legality according to the identity $I_{GB}$ after receiving the third message.

The trusted third party TP checks the second group for legality particularly in the following several approaches:

In the third message, if the identity $I_{GB}$ of the second group is a distinguishing identifier GB of the second group, then the trusted third party TP searches for a valid public key PublicKey$_{GB}$ of the second group; and if the identity $I_{GB}$ of the second group is a certificate Cert$_{GB}$ of the second group, then the trusted third party TP checks the certificate Cert$_{GB}$ for validity Valid$_{GB}$.

5) The trusted third party TP returns a fourth message to the entity A after checking the second group for legality, where the fourth message includes a verification result Res$_{GB}$ of the second group, a token TokenTA and an optional text Text6, wherein a preferred embodiment of the TokenTA is TokenTA=$sS_T$($R'_A$∥Res$_{GB}$∥Text5), and in another embodiment, the TokenTA includes at least a signature of the trusted third party TP on a message including the $R'_A$ and the Res$_{GB}$.

6) The entity A verifies the fourth message after receiving the fourth message. The verification process is as follows:

6.1) The entity A verifies the signature of the trusted third party TP in the TokenTA in the fourth message and checks whether the random number $R'_A$ generated by the entity A in the third message is consistent with the random number $R'_A$ contained in the signature of the trusted third party TP in the TokenTA, and if the verification passes, then the entity A performs the step 6.2);

6.2) The entity A obtains the verification result Res$_{GB}$ of the second group, and if the second group is determined to be legal and valid according to the Res$_{GB}$, then the entity A performs the step 6.3); otherwise, the entity A finishes the identification of the entity B; and 6.3) The entity A obtains the public key PublicKey$_{GB}$ of the second group, verifies the signature of the entity B in the token TokenBA in the second message and checks whether the random number $R_A$ generated by the entity A in the first message is consistent with the random number $R_A$ contained in the signature of the entity B in the TokenBA, and if the verification passes, the entity A finishes the identification of the entity B.

The presence and contents of the arisen optional texts Text1, Text2, Text3, . . . , in the foregoing embodiments are indeterminate in view of the possibility for implementers to define contents of the optional texts by themselves as their specific requirements, to achieve the purpose of extending the optional texts, and thus the optional texts may be omitted in other embodiments.

Based upon the same inventive idea, embodiments of the invention further provide two entity devices for anonymous entity identification and a device for legality verification, and since these devices address the problem under a similar principle to that of the method for anonymous entity identification, reference can be made to the implementations of the methods for implementations thereof, and a repeated description will be omitted here.

Figure 3:
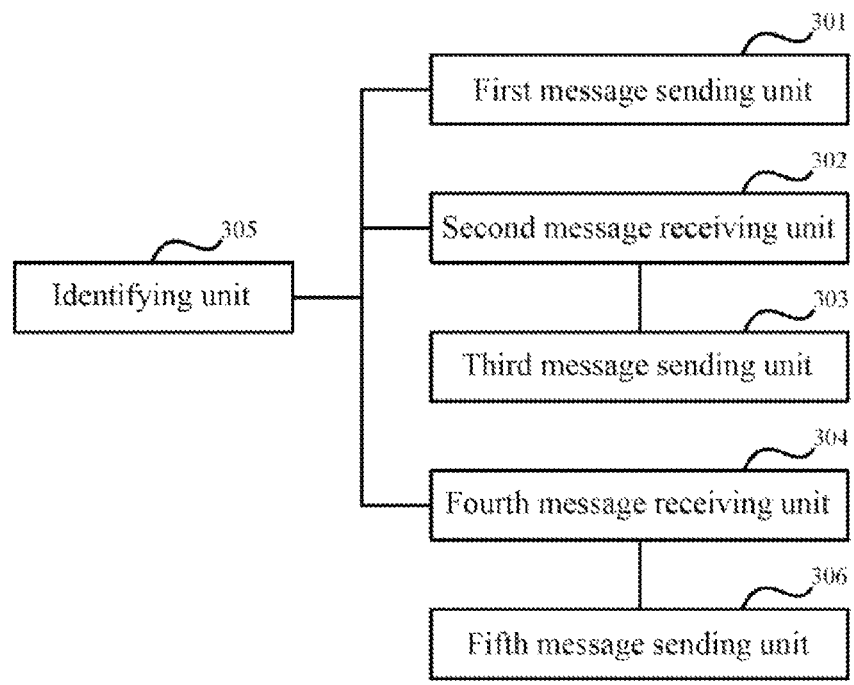
FIG. 3 is a structural diagram of an entity device for anonymous entity identification according to an embodiment of the invention.

An entity device for anonymous entity identification according to an embodiment of the invention, as illustrated in FIG. 3, includes:

A first message sending unit 301 configured to send a first message to an entity B, where the first message includes a random number $R_A$ generated by the entity device for anonymous entity identification (entity A);

A second message receiving unit 302 configured to receive a second message returned from the entity B, where the second message includes an identity $I_{GB}$ of a second group and a token field TokenBA containing a signature of the entity B on a message including a distinguishing identifier GB of the second group and the $R_A$, and the entity B resides in the second group;

A third message sending unit 303 configured to send a third message to a trusted third party TP after receiving the second message, wherein the third message comprises the $I_{GB}$;

A fourth message receiving unit 304 configured to receive a fourth message retuned from the trusted third party TP after checking the second group for legality, wherein the fourth message comprises a verification result Res$_{GB}$ of the second group; and An identifying unit 305 configured to identify identity of the entity B according to the verification result Res$_{GB}$ in the fourth message and the token field TokenBA after receiving the fourth message and verifying the fourth message for validity.

Preferably, the identifying unit 305 is configured to identify the identity of the entity B according to the verification result Res$_{GB}$ in the fourth message and the token field TokenBA, which is specifically configured:

6.2) To obtain the verification result Res$_{GB}$ of the second group, and if the second group is determined to be legal and valid according to the Res$_{GB}$, then to perform step 6.3); otherwise, to finish the identity identification of the entity B; and 6.3) To obtain a public key PublicKey$_{GB}$ of the second group, to verify the signature of the entity B in the TokenBA in the second message and to check whether the random number $R_A$ in the first message is consistent with the random number $R_A$ contained in the signature of the entity B in the TokenBA to thereby finish the identity identification of the entity B.

Preferably, the third message further comprises a random number $R'_A$ regenerated by the device for anonymous entity identification, the fourth message further comprises a token field TokenTA containing a signature of the TP on a message comprising the $R'_A$ and the Res$_{GB}$, and the process of verifying the fourth message for validity by the identifying unit 305 includes:

6.1) The entity A verifies the signature of the trusted third party TP in the TokenTA in the fourth message, and when the signature is valid, the entity A checks whether the random number $R'_A$ generated by the entity device for anonymous entity identification in the third message is consistent with a random number $R'_A$ contained in the signature of the trusted third party TP in the TokenTA, and if they are consistent, then the entity A determines that the fourth message is valid.

Preferably, the first message further specifically comprises an identity $I_{GA}$ of the device for anonymous entity identification which resides in a first group, the third message further includes the $I_{GA}$, and in the step 4), the TP further checks the first group for legality according to the $I_{GA}$ after receiving the third message, the fourth message further comprises a verification result $Res_{GA}$ of the first group, and the device further comprises:

A fifth message sending unit 306 configured to send a fifth message to the entity B, wherein the fifth message comprises a token field TokenAB containing the $Res_{GA}$ and a signature of the device for anonymous entity identification on a message comprising a GA, the $R_A$ and the GB; or the third message comprises a random number $R'_A$ regenerated by the device for anonymous entity identification, the TokenAB comprises the $R'_A$, the $Res_{GB}$, the $Res_{GA}$, the TokenTA and a signature of the device for anonymous entity identification on a message comprising the GA, the $R_A$ and the GB.

Figure 4:
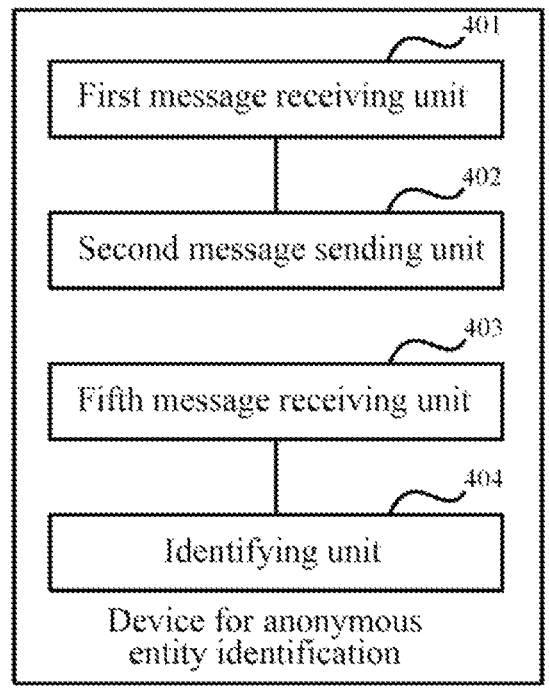
FIG. 4 is a structural diagram of another entity device for anonymous entity identification according to an embodiment of the invention.

An embodiment of the invention further provides another device for anonymous entity identification (an entity B) as illustrated in FIG. 4, which includes:

A first message receiving unit 401 configured to receive a first message sent by an entity A, wherein the first message comprises a random number $R_A$ generated by the entity A; and A second message sending unit 402 configured to return a second message to the entity A after receiving the first message, wherein the second message comprises an identity $I_{GB}$ of a second group and a token field TokenBA containing a signature of the device for anonymous entity identification on a message comprising a GB and the $R_A$, and the device for anonymous entity identification resides in the second group.

Preferably, the first message further specifically comprises an identity $I_{GA}$ of a first group in which the entity A resides, and the device further comprises:

A fifth message receiving unit 403 configured to receive a fifth message sent by the entity A, wherein the fifth message comprises a token field TokenAB containing a $Res_{GA}$ and a signature of the entity A on a message comprising a GA, the $R_A$ and the GB; or the third message comprises a random number $R'_A$ regenerated by the entity A, and the TokenAB comprises the $R'_A$, a $Res_{GB}$, the $Res_{GA}$ and a signature of the entity A on a message comprising the GA, the $R_A$ and the GB, wherein the $Res_{GA}$ is a verification result of the first group by a trusted third party TP, and the $Res_{GB}$ is a verification result of the second group by the trusted third party TP; and An identifying unit 404 configured to identify identity of the entity A according to the token field TokenAB in the fifth message after receiving the fifth message and verifying the fifth message for validity.

Preferably, the identifying unit 404 is configured to identify the identity of the entity A according to the token field TokenAB in the fifth message, which is specifically configured:

8.2) To obtain the $Res_{GA}$, and if the first group is determined to be legal and valid according to the $Res_{GA}$, then to perform step 8.3); otherwise, to finish the identification of the entity A; and 8.3) To obtain a public key of the first group, to verify the signature of the entity A in the TokenAB and to check whether the distinguishing identifier GB of the second group is consistent with the GB contained in the signature data of the entity A in the TokenAB to thereby finish the identity identification of the entity A.

Preferably, the second message further comprises a random number $R_B$ generated by the device for anonymous entity identification, and the fifth message further comprises a TokenTA2 or a TokenTA, wherein the TokenTA2 comprises a signature of the trusted third party TP on a message comprising the $R_B$ and the $Res_{GA}$, the TokenTA comprises a signature of the trusted third party TP on a message comprising the $R'_A$, the $R_B$, the $Res_{GB}$ and the $Res_{GA}$, the $R'_A$ is a random number regenerated by the entity A when sending the third message to TP, and the identifying unit 404 is configured to verify the fifth message for validity, which is specifically configured:

8.1) To verify the signature of the trusted third party TP contained in the TokenTA or the TokenTA2 in the TokenAB and to check whether the $R_B$ generated by the device for anonymous entity identification in the second message is consistent with the $R_B$ contained in the signature of the trusted third party TP in the TokenTA or the TokenTA2, and if they are consistent, to determine that the fifth message is valid.

Preferably, the TokenAB comprises the $Res_{GA}$, the TokenTA2 and a signature of the entity A on a message comprising the GA, the $R_A$, the GB, the $R_B$ and the TokenTA2; or the TokenAB comprises the $R'_A$, the $Res_{GB}$, the $Res_{GA}$, the TokenTA and a signature of the entity A on a message comprising the GA, the $R_A$, the GB, the $R_B$ and the TokenTA, and after verifying the signature of the entity A in the TokenAB, the identifying unit 404 is further configured:

To check whether the $R_B$ in the second message is consistent with the $R_B$ contained in the signature of the entity A in the TokenAB.

Figure 5:
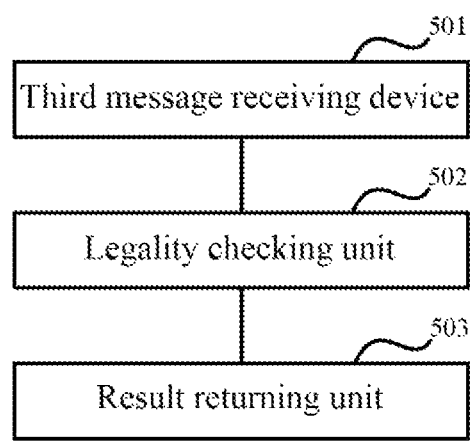
FIG. 5 is a structural diagram of a device for legality verification according to an embodiment of the invention.

An embodiment of the invention further provides a device for legality verification as a trusted third party as illustrated in FIG. 5, which includes:

A third message receiving device 501 configured to receive a third message sent by an entity A, wherein the third message comprises an $I_{GB}$ or the $I_{GB}$ and an $I_{GA}$, the $I_{GB}$ is an identity of a second group, the $I_{GA}$ is an identity of a first group, and the entity A resides in the first group;

A legality checking unit 502 configured to check the second group or the second group and the first group for legality according to the $I_{GB}$ or the $I_{GB}$ and the $I_{GA}$ after receiving the third message; and A result returning unit 503 configured to return a fourth message to the entity A after checking the second group or the second group and the first group for legality, wherein the fourth message comprises a verification result $Res_{GB}$ of the second group or verification results $Res_{GB}$ and $Res_{GA}$ of the second group and the first group.

Preferably, the legality checking unit 502 is configured to check the second group or the second group and the first group for legality, which is specifically configured:

In the third message, if the $I_{GA}$ is a distinguishing identifier GA of the first group, to search for a valid public key PublicKey$_{GA}$ of the first group; and if the $I_{GA}$ is a certificate Cert$_{GA}$ of the first group, to check the certificate Cert$_{GA}$ for validity Valid$_{GA}$; and If the $I_{GB}$ is a distinguishing identifier GB of the second group, to search for a valid public key PublicKey$_{GB}$ of the second group; and if the $I_{GB}$ is a certificate Cert$_{GB}$ of the second group, to check the certificate Cert$_{GB}$ for validity Valid$_{GB}$.

Preferably, the fourth message returned from the result returning unit 503 includes TokenTA or includes TokenTA1 and TokenTA2, where TokenTA includes a TokenTA or comprises a TokenTA1 and a TokenTA2, wherein the TokenTA comprises a signature of the device on a message comprising an $R'_A$, an $R_B$, the $Res_{GB}$ and the $Res_{GA}$, the TokenTA1 comprises a signature of the device on a message comprising the $R'_A$ and the $Res_{GB}$, and the TokenTA2 comprises a signature of the device on a message comprising the $R_B$ and the $Res_{GA}$.

Although the preferred embodiments of the invention have been described, those skilled in the art benefiting from the essential inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the embodiments of the invention without departing from the spirit and scope of the embodiments of the invention. Thus the invention is also intended to encompass these modifications and variations thereto so long as these modifications and variations to the embodiments of the invention come into the scope of the claims appended to the invention and their equivalents.

The invention claimed is:

1. A method of anonymous entity identification comprising the following steps:
   a step 1, sending, by an entity A, a first message to an entity B, wherein the first message comprises a random number $R_A$ generated by the entity A;
   a step 2, returning, by the entity B, a second message to the entity A after receiving the first message, wherein the second message comprises an identity $I_{GB}$ of a second group and a token field TokenBA containing a signature of the entity B on a message including a distinguishing identifier GB of the second group and the $R_A$, and the entity B resides in the second group;
   a step 3, sending, by the entity A, a third message to a trusted third party TP after receiving the second message, wherein the third message comprises the $I_{GB}$;
   a step 4, checking, by the trusted third party TP, the second group for legality according to the $I_{GB}$ after receiving the third message;
   a step 5, returning, by the trusted third party TP, a fourth message to the entity A after checking the second group for legality, wherein the fourth message comprises a verification result $Res_{GB}$ of the second group; and
   a step 6, identifying, by the entity A, identity of the entity B according to the verification result $Res_{GB}$ in the fourth message and the token field TokenBA after receiving the fourth message and verifying the fourth message for validity;
   wherein, in the step 6, identifying the identity of the entity B according to the verification result $Res_{GB}$ in the fourth message and the token field TokenB comprises:
   a step 6.2, obtaining, by the entity A, the verification result $Res_{GB}$ of the second group and, if the second group is determined to be legal and valid according to the $Res_{GB}$, then performing a step 6.3; otherwise, finishing, by the entity A, the identity identification of the entity B; and
   the step 6.3, obtaining, by the entity A, a public key PublicKey$_{GB}$ of the second group, verifying the signature of the entity B in the TokenBA in the second message and checking whether the random number $R_A$ in the first message is consistent with the random number $R_A$ contained in the signature of the entity B in the TokenBA to thereby finish the identity identification of the entity B;
   wherein each of the entity A, the entity B and the trusted third party TP comprises a transmitter that transmits messages and a receiver that receives messages.

2. The method according to claim 1, wherein the third message further comprises a random number $R'_A$ regenerated by the entity A, the fourth message further comprises a token field TokenTA containing a signature of the TP on a message comprising the $R'_A$ and the $Res_{GB}$, and in the step 6, the process of verifying the fourth message for validity comprises:
   a step 6.1, verifying, by the entity A, the signature of the trusted third party TP in the TokenTA in the fourth message, and when the signature is valid, checking whether the random number $R'_A$ generated by the entity A in the third message is consistent with a random number $R'_A$ contained in the signature of the trusted third party TP in the TokenTA, and if they are consistent, then determining that the fourth message is valid.

3. The method according to claim 1, wherein the first message further comprises an identity $I_{GA}$ of a first group in which the entity A resides, the third message comprises the $I_{GA}$, and in the step 4, TP further checks the first group for legality according to the $I_{GA}$ after receiving the third message, and the fourth message further comprises a verification result $Res_{GA}$ of the first group; and
   after the step 6, the method further comprises:
   a step 7, sending, by the entity A, a fifth message to the entity B, wherein the fifth message comprises a token field TokenAB containing the $Res_{GA}$ and a signature of the entity A on a message comprising a GA, the $R_A$ and the GB; or the third message comprises a random number $R'_A$ regenerated by the entity A, the TokenAB comprises the $R'_A$, the $Res_{GB}$, the $Res_{GA}$ and a signature of the entity A on a message comprising the GA, the $R_A$ and the GB, and the GA is a distinguishing identifier of the first group; and
   a step 8, identifying, by the entity B, identity of the entity A according to the token field TokenAB in the fifth message after receiving the fifth message and verifying the fifth message for validity.

4. The method according to claim 3, wherein in the step 8, identifying, by the entity B, the identity of the entity A according to the token field TokenAB in the fifth message specifically comprises:
   a step 8.2, obtaining, by the entity B, the $Res_{GA}$, and if the first group is determined to be legal and valid according to the $Res_{GA}$, then performing a step 8.3; otherwise, finishing, by the entity B, the identification of the entity A; and
   the step 8.3, obtaining, by the entity B, a public key of the first group, verifying the signature of the entity A in the TokenAB and checking whether the distinguishing identifier GB of the second group is consistent with the distinguishing identifier GB contained in the signature data of the entity A in the TokenAB to thereby finish the identity identification of the entity A.

5. The method according to claim 4, wherein the second message further comprises a random number $R_B$ generated by the entity B, the third message comprises the $R_B$ and the random number $R'_A$ regenerated by the entity A, and the fourth message comprises the TokenTA or comprises a TokenTA1 and a TokenTA2, wherein the TokenTA comprises a signature of the trusted third party TP on a message comprising the $R'_A$, the $R_B$, the $Res_{GB}$ and the $Res_{GA}$, the TokenTA1 comprises a signature of the trusted third party TP on a message comprising the $R'_A$ and the $Res_{GB}$, and the TokenTA2 comprises a signature of the trusted third party TP on a message comprising the $R_B$ and the $Res_{GA}$; and receiving, by the entity B, the fifth message and verifying the fifth message for validity specifically comprises:
   a step 8.1, verifying, by the entity B, the signature of the trusted third party TP contained in the TokenTA or the TokenTA2 in the TokenAB and checking whether the $R_B$ generated by the entity B in the second message is consistent with the $R_B$ contained in the signature of the trusted third party TP in the TokenTA or the TokenTA2, and if they are consistent, then determining that the fifth message is valid.

6. The method according to claim 5, wherein the TokenAB comprises the $Res_{GA}$, the TokenTA2 and a signature of the entity A on a message comprising the GA, the $R_A$, the GB, the $R_B$ and the TokenTA2; or the TokenAB comprises the $R'_A$, the $Res_{GB}$, the $Res_{GA}$, the TokenTA and a signature of the entity A on a message comprising the GA, the $R_A$, the GB, the $R_B$ and the TokenTA, and in the step 8.3, after verifying, by the entity B, the signature of the entity A in the TokenAB, the method further comprises:

checking whether the $R_B$ in the second message is consistent with the $R_B$ contained in the signature of the entity A in the TokenAB.

7. The method according to claim 1, wherein in the step 4, checking, by the trusted third party TP, the second group or the first group and the second group for legality specifically comprises:

in the third message, if the $I_{GA}$ is the distinguishing identifier GA of the first group, then searching, by the TP, for a valid public key $PublicKey_{GA}$ of the first group; and if the $I_{GA}$ is a certificate $Cert_{GA}$ of the first group, then checking, by the TP, the certificate $Cert_{GA}$ for validity $Valid_{GA}$; and if the $I_{GB}$ is the distinguishing identifier GB of the second group, then searching, by the TP, for a valid public key $PublicKey_{GB}$ of the second group; and if the $I_{GB}$ is a certificate $Cert_{GB}$ of the second group, then checking, by the TP, the certificate $Cert_{GB}$ for validity $Valid_{GB}$.

8. The method according to claim 1, wherein the random numbers $R_A$, $R'_A$ and $R_B$ are replaced with time labels or sequence numbers.

9. The method according to claim 1, wherein the first message, the third message and the fourth message further comprise optional texts respectively.

10. An entity device for anonymous entity identification, comprising:

a first message sending unit configured to send a first message to an entity B, wherein the first message comprises a random number $R_A$ generated by the entity device for anonymous entity identification;

a second message receiving unit configured to receive a second message returned from the entity B, wherein the second message comprises an identity $I_{GB}$ of a second group and a token field TokenBA containing a signature of the entity B on a message comprising a distinguishing identifier GB of the second group and the $R_A$, and the entity B resides in the second group;

a third message sending unit configured to send a third message to a trusted third party TP after receiving the second message, wherein the third message comprises the $I_{GB}$;

a fourth message receiving unit configured to receive a fourth message returned from the trusted third party TP after checking the second group for legality, wherein the fourth message comprises a verification result $Res_{GB}$ of the second group; and an identifying unit configured to identify identity of the entity B according to the verification result $Res_{GB}$ in the fourth message and the token field TokenBA after receiving the fourth message and verifying the fourth message for validity;

wherein the identifying unit is configured to identify the identity of the entity B according to the verification result $Res_{GB}$ in the fourth message and the token field TokenBA, which is configured:

to obtain the verification result $Res_{GB}$ of the second group and, if the second group is determined to be legal and valid according to the $Res_{GB}$, then to obtain a public key $PublicKey_{GB}$ of the second group, to verify the signature of the entity B in the TokenBA in the second message and to check whether the random number $R_A$ in the first message is consistent with the random number $R_A$ contained in the signature of the entity B in the TokenBA to thereby finish the identity identification of the entity B; otherwise, to finish the identity identification of the entity B;

wherein the entity device comprises a transmitter that transmits messages and a receiver that receives messages.

11. The device according to claim 10, wherein the third message further comprises a random number $R'_A$ regenerated by the device for anonymous entity identification, the fourth message further comprises a token field TokenTA containing a signature of the TP on a message comprising the $R'_A$ and the $Res_{GB}$, and the process of verifying the fourth message for validity by the identifying unit comprises:

verifying the signature of the trusted third party TP in the TokenTA in the fourth message, and when the signature is valid, checking whether the random number $R'_A$ generated by the entity device for anonymous entity identification in the third message is consistent with a random number $R'_A$ contained in the signature of the trusted third party TP in the TokenTA, and if they are consistent, then determining that the fourth message is valid.

12. The device according to claim 10, wherein the first message further specifically comprises an identity $I_{GA}$, of the device of anonymous entity identification which resides in a first group, the third message comprises the $I_{GA}$, the fourth message further comprises a verification result $Res_{GA}$ of the first group, and the device further comprises:

a fifth message sending unit configured to send a fifth message to the entity B, wherein the fifth message comprises a token field TokenAB containing the $Res_{GA}$ and a signature of the device for anonymous entity identification on a message comprising a GA, the $R_A$ and the GB; or the third message comprises a random number $R'_A$ regenerated by the device for anonymous entity identification, the TokenAB comprises the $R'_A$, the $Res_{GB}$, the $Res_{GA}$, the TokenTA and a signature of the device for anonymous entity identification on a message comprising the GA, the $R_A$ and the GB, and the GA is a distinguishing identifier of the first group.

13. A device for anonymous entity identification, comprising:

a first message receiving unit configured to receive a first message sent by an entity A, wherein the first message comprises a random number $R_A$ generated by the entity A; and a second message sending unit configured to return a second message to the entity A after receiving the first message, wherein the second message comprises an identity $I_{GB}$ of a second group and a token field TokenBA containing a signature of the device for anonymous entity identification on a message comprising a GB and the $R_A$, and the device for anonymous entity identification resides in the second group;

wherein the first message further comprises an identity $I_{GA}$ of a first group in which the entity A resides, and the device further comprises:

a fifth message receiving unit configured to receive a fifth message sent by the entity A, wherein the fifth message comprises a token field TokenAB containing a $Res_{GA}$ and a signature of the entity A on a message comprising a GA, the $R_A$ and the GB; or the third message comprises a random number $R'_A$ regenerated by the entity A, and the TokenAB comprises the $R'_A$, a $Res_{GB}$, the $Res_{GA}$ and a signature of the entity A on a message comprising the GA, the $R_A$ and the GB, wherein the $Res_{GA}$ is a verification result of the first group by a trusted third party TP, and the $Res_{GB}$ is a verification result of the second group by the trusted third party TP; and the device further comprises an identifying unit configured to identify identity of the entity A according to the token field TokenAB in the fifth message after receiving the fifth message and verifying the fifth message for validity;

wherein the identifying unit is configured to identify the identity of the entity A according to the token field TokenAB in the fifth message, which is configured:

to obtain the $Res_{GA}$ and, if the first group is determined to be legal and valid according to the $Res_{GA}$, then to obtain a public key of the first group, to verify the signature of the entity A in the TokenAB and to check whether the distinguishing identifier GB of the second group is consistent with the GB contained in the signature data of the entity A in the TokenAB to thereby finish the identity identification of the entity A; otherwise, to finish the identification of the entity A;

wherein the device comprises a transmitter that transmits messages and a receiver that receives messages.

14. The device according to claim 13, wherein the second message further comprises a random number $R_B$ generated by the device for anonymous entity identification, and the fifth message further comprises a TokenTA2 or a TokenTA, wherein the TokenTA2 comprises a signature of the trusted third party TP on a message comprising the $R_B$ and the $Res_{GA}$, the TokenTA comprises a signature of the trusted third party TP on a message comprising the $R'_A$, the $R_B$, the $Res_{GB}$ and the $Res_{GA}$, the $R'_A$ is a random number regenerated by the entity A when sending the third message to TP, and the identifying unit is configured to verify the fifth message for validity, which is specifically configured:

to verify the signature of the trusted third party TP contained in the TokenTA or the TokenTA2 in the TokenAB and to check whether the $R_B$ generated by the device for anonymous entity identification in the second message is consistent with the $R_B$ contained in the signature of the trusted third party TP in the TokenTA or the TokenTA2, and if they are consistent, to determine that the fifth message is valid.

15. The device according to claim 14, wherein the TokenAB comprises the $Res_{GA}$, the TokenTA2 and a signature of the entity A on a message comprising the GA, the $R_A$, the GB, the $R_B$ and the TokenTA2; or the TokenAB comprises the $R'_A$, the $Res_{GB}$, the $Res_{GA}$, the TokenTA and a signature of the entity A on a message comprising the GA, the $R_A$, the GB, the $R_B$ and the TokenTA, and after verifying the signature of the entity A in the TokenAB, the identifying unit is further configured:

to check whether the $R_B$ in the second message is consistent with the $R_B$ contained in the signature of the entity A in the TokenAB.

* * * * *